(12) United States Patent
Caine et al.

(10) Patent No.: US 9,130,882 B1
(45) Date of Patent: Sep. 8, 2015

(54) DYNAMIC ASSIGNMENT OF A TARGET WEB PAGE BASED ON REQUEST CONTEXT

(71) Applicant: priceline.com LLC, Norwark, CT (US)

(72) Inventors: John Caine, Bridgeport, CT (US); Michael Diliberto, Ritchfield, CT (US); Jonathan Taylor, Ridgefield, CT (US); Michael P. Gonzalez, Valparaiso, IN (US); Scott Lake, Bethel, CT (US)

(73) Assignee: priceline.com LLC, Norwalk, CT (US)

( * ) Notice: Subject to any disclaimer, the term of this patent is extended or adjusted under 35 U.S.C. 154(b) by 0 days.

(21) Appl. No.: 14/270,179

(22) Filed: May 5, 2014

(51) Int. Cl.
*G06F 15/16* (2006.01)
*H04L 12/911* (2013.01)
*H04L 29/08* (2006.01)
*G06F 17/30* (2006.01)
*H04L 12/28* (2006.01)

(52) U.S. Cl.
CPC .......... *H04L 47/70* (2013.01); *H04L 29/08972* (2013.01); *H04L 67/02* (2013.01); *H04L 67/327* (2013.01); *G06F 17/30867* (2013.01); *H04L 12/2856* (2013.01)

(58) Field of Classification Search
CPC .................... H04L 12/2856; H04L 29/08972; H04L 67/02; H04L 67/327; H04L 47/70; G06F 17/30867
USPC ........................................ 709/203, 224, 246
See application file for complete search history.

(56) References Cited

U.S. PATENT DOCUMENTS

| | | | |
|---|---|---|---|
| 7,870,253 B2 * | 1/2011 | Muilenburg et al. | 709/224 |
| 2010/0082780 A1 * | 4/2010 | Muilenburg et al. | 709/221 |
| 2011/0126290 A1 * | 5/2011 | Krishnamurthy et al. | 726/26 |
| 2011/0184813 A1 * | 7/2011 | Barnes et al. | 705/14.66 |
| 2011/0185016 A1 * | 7/2011 | Kandasamy et al. | 709/203 |
| 2011/0231482 A1 * | 9/2011 | Benna | 709/203 |
| 2012/0017146 A1 * | 1/2012 | Travieso et al. | 715/265 |
| 2012/0203639 A1 * | 8/2012 | Webster et al. | 705/14.66 |

* cited by examiner

*Primary Examiner* — Patrice Winder
(74) *Attorney, Agent, or Firm* — Hickman Palermo Becker Bingham LLP

(57) ABSTRACT

Techniques for the dynamic assignment of a target website resource based on request context are described. In an embodiment, a request for a website resource of a requested website is received. One or more context values associated with the request are determined, including a particular context value identifying information associated with a referral website that is different from the requested website. A particular website resource from a plurality of website resources is selected based on the one or more context values associated with the request. The particular website resource is caused to be delivered.

30 Claims, 5 Drawing Sheets

DYNAMIC ASSIGNMENT OF A TARGET WEB PAGE BASED ON REQUEST CONTEXT

FIELD OF THE DISCLOSURE

The disclosure generally relates to computer-implemented techniques for server computers that deliver electronic resources, such as web pages, to client computers. The disclosure more specifically relates to approaches for dynamically selecting a website resource, such as a web page, in response to a request for a website resource and to approaches for selecting a particular website resource based on the context of the request.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Client computers frequently access websites at server computers by selecting links to web pages that appear on web pages of different websites or applications as rendered in a browser at the client computers. For example, website owners may choose to advertise their website with a search engine operator. Once the website owner registers an advertisement, the search engine operator may cause the advertisement to appear near search results for a web search in exchange for a monetary payment by the owner of the registered website. Links to websites also may occur in search results without payment or advertising, simply because the links are the most relevant results for a search query.

As another example, a website owner may choose to advertise its website on a web page of a related website that is not a search engine operator. For example, an owner of a rental car website may pay to have an advertisement for the rental car website appear on a web page of a hotel reservation website. The advertisements may function as links. That is, when a user clicks on an advertisement, the user device may be directed to the website of the advertiser. The website owner may provide the uniform resource locator (URL) of a web page to the operator of the website or application in which the advertisement appears.

The best web page or web page content to be shown to a user may be different for different requests depending on the context of the request, such as the device requesting the web page or the referral source of the web page request. However, in past approaches, web server computers typically direct all incoming client computer requests to the same page or application area regardless of context. Better approaches for delivering the web page that best matches the needs of a user at the time of the request are needed. Similarly, website resources other than web pages, such as images or JavaScript Object Notation (JSON) data files may be requested, and better approaches for selecting the website resource that best matches the needs of the user are also needed in such contexts.

SUMMARY

Figure 1:
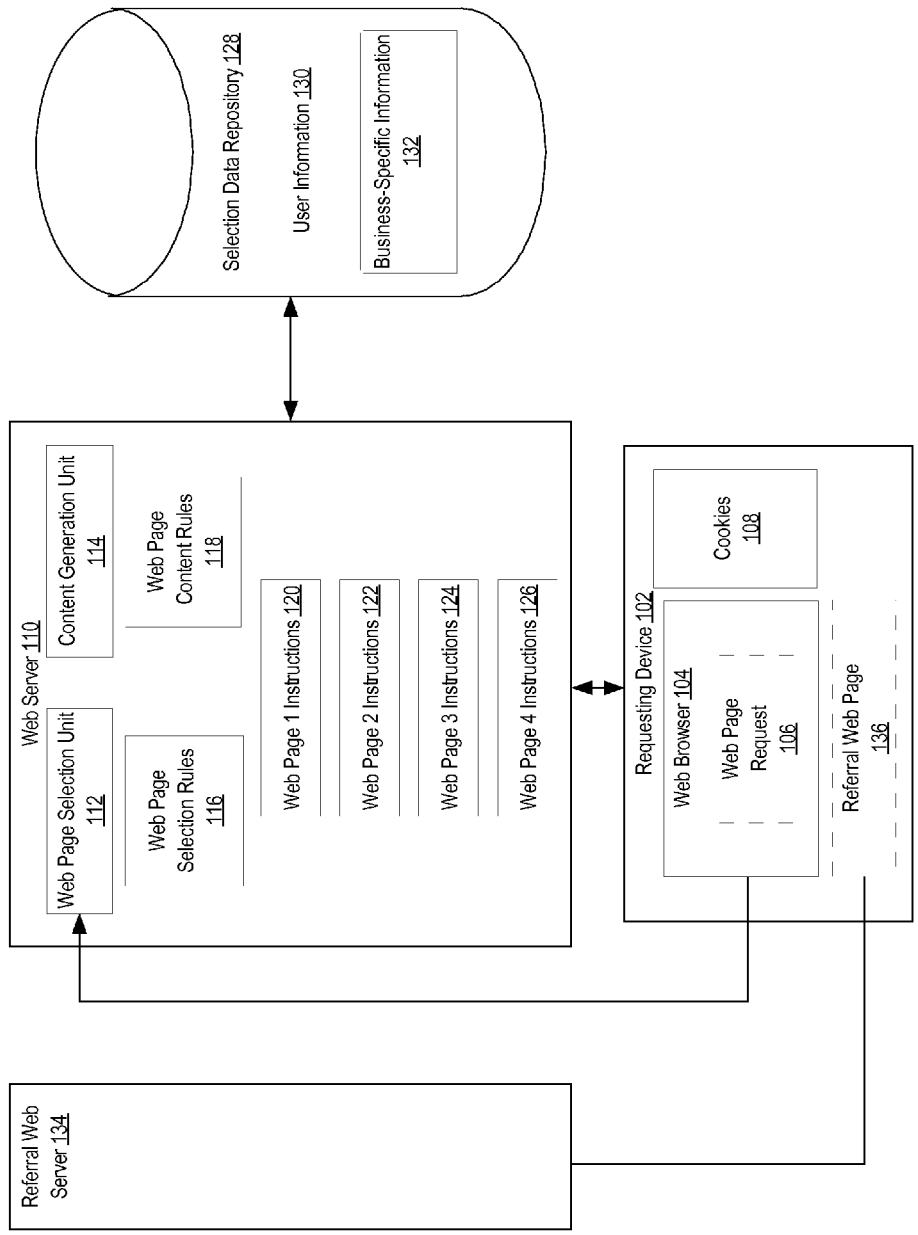
FIG. 1 illustrates an example dynamic web page assignment system.

The appended claims may serve as a summary of the invention.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1. General Overview
 2. Structural and Functional Overview
 2.1 Determining Context Values
 2.2 Selection of a Web Page Based On Context Values
 2.3 Generation Of Web Page Content Based On Context Values
 3. Implementation Mechanisms-Hardware Overview
 1. General Overview Techniques for the dynamic assignment of a target web page based on request context are described. According to an embodiment, in response to receiving a request for a web page of a requested website, one or more context values associated with the request are determined. The one or more context values include a particular context value identifying information associated with a referral source that is different from the requested website. For example, the request may have been sent by a device in response to the device selecting a link to the requested web page, where the link was posted on a referral website or a referral application that is different from the requested website. The information associated with the referral source may identify the application, web page, or website that contained the link to the requested web page. The information may instead or additionally indicate how the device that sent the web page request (the "requesting device") interacted with the referral source. For example, the information associated with the referral website may identify input that was sent by the requested device to a server of a referral website during the device's interactions with the referral website.

In some embodiments, other context values may also be determined. Examples of context values include context values determined based on information contained in the web page request, stored user information, and/or stored business-specific information.

The web server may select a particular web page from a plurality of web pages based on the one or more context values associated with the request and may cause the particular web page to be delivered to the requesting device.

In some embodiments, an operator of a target website may instruct the operators of different third-party websites to direct a requesting device to the same URL when an advertisement of the website is selected, regardless of the context of the web page request, such as which web page the advertisement appears on or what the prior input received from the requesting device was. In response to receiving the web page request, a web server associated with the target website may select the web page to deliver based on the context of the web page request.

In some embodiments, a website operator may update the logic for selecting a web page at a web server associated with the website without having to update a URL that was previously provided to operators of third-party websites.

Additionally, in some embodiments, the web server may select a web page for delivery based on information that may not be available to a referral source, such as user information or business-specific information that may not be publicly available.

One approach sometimes encountered is that a server computer may be configured to determine the type of client computer that initiated the request, such as a mobile phone or tablet computer, and deliver data or pages that are formatted in a way that is compatible with or optimized for the client computer. However, this approach typically involves merely "skinning" the same underlying web application so that output pages look good on the client computer; it does not normally take into account larger issues of context relating to the user, a prior search request, or a referring website. In another approach, the identity of a referring website might be received in the REFERER field of an Hypertext Transfer Protocol (HTTP) header, but normally this data is used only for determining the payment of fees or a revenue share to the referrer or for accumulating statistical data, and the REFERER value is not used for the purpose of selecting a web page, an application subsystem, or other content or data that may be appropriate for the context reflected in or implied by the REFERER field.

2. Structural and Functional Overview

FIG. 1 illustrates an example dynamic web page assignment system. Requesting device 102 may be any computing device, such as a desktop, personal computer, tablet, or smartphone. Requesting device 102 comprises web browser 104, which may request websites from web server 110 and cause display of the requested websites at requesting device 102. Web browser 104 may cause cookies 108 to be stored at requesting device 102 based on responses received from web servers such as web server 110 or referral web server 134. Web browser 104 may cause values stored in cookies 108 to be included in a request sent to a web server 110, such as web page request 106.

Web server 110 is a web server associated with a particular website and may receive requests for web pages from a plurality of different client devices including requesting device 102. Web page selection rules 116 indicate which web page that is selected for a particular context value or combination of context values. Web page selection unit 112 determines context values associated with a particular request, such as web page request 106, and selects a particular web page for the request in accordance with web page selection rules 116.

In some embodiments, content generation unit 114 generates some content of the selected website after the selection of the website. Content generation unit 114 generates the content in accordance with web page content rules 118, which indicate the content that is generated for different context values or combinations of context values.

In some embodiments, each web page of the plurality of web pages that may be selected is a dynamic web page and is associated with instructions for generating the web page. For example, web page 1 instructions 120, web page 2 instructions 122, web page 3 instructions 124, and web page 4 instructions 126 may each be configured to generate a separate web page. In response to the selection of a web page, web page selection unit 112 may cause the instructions associated with the selected web page to execute. In another embodiment, the web pages may be dynamic and the web pages may be stored at web server 110, or separately accessible to web server 110, without requiring any instructions to be performed to cause their generation.

Selection data repository 128 represents one or more storage units that may be communicatively coupled with web server 110. The one or more storage units may be separate from web server 110 or may alternatively be included in web server 110. Web server 110 may determine context values associated with a web page request in part by accessing data in selection data repository 128, such as user information 130 and business-specific information 132.

Requesting device 102 may also request web pages from referral web server 134, such as referral web page 136. Web browser 104 may cause referral web page 136 to be displayed at requesting device 102. Additionally, in some embodiments, web browser 104 may store one or more cookies in response to receiving instructions to store the cookies from referral web server 134.

Figure 2:
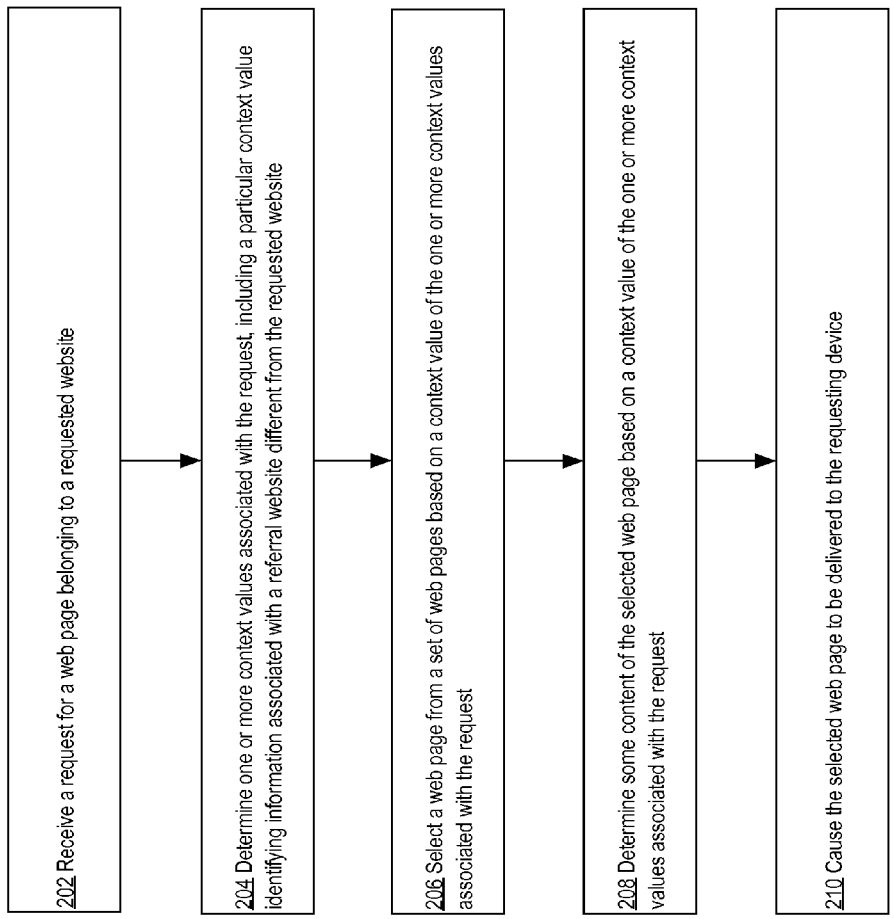
FIG. 2 illustrates an example process for dynamically selecting a web page in response to receiving a request for a web page.

FIG. 2 illustrates an example process for dynamically selecting a web page in response to receiving a request for a web page. The process of FIG. 2 may be performed at web page selection unit 112 and content generation unit 114. At block 202, web page selection unit 112 receives a request for a web page belonging to a requested website. The request for the web page may be web page request 106, sent from requesting device 102 to web server 110. In other embodiments some other resource of the website may be requested instead of a web page, such as an image or JSON data file.

The web page request may be associated with a referral source. The referral source may be the web page or application that referred the requesting device to the requested web page. For example, if clicking on a link in referral web page 136 causes web browser 104 to send web page request 106 to web server 110, the referral source of web page request 106 may be referral web page 136.

Referral web page 136 may be a page of a referral website associated with referral web server 134. The referral website may be different than the target website associated with web server 110. The operator of the target website may have provided a URL for the target website to the operator of the referral website and the operator of the target website may have paid monetary or non-monetary consideration to have web page(s) of the referral website link to the target website. As a result, the operator of the referral website may have configured referral web page 136 to contain a link to the specified URL.

2.1 Determining Context Values

At block 204, web page selection unit 112 determines one or more context values associated with the request, including a particular context value identifying information associated with a referral website different from the requested website.

In an embodiment, the context value identifying information associated with the referral website may identify the referral website. Instead or additionally, the context value may identify input provided by a requesting device during its interaction with the referral website. The input may have been sent to a web server of the referral website. For example, the referral website associated with referral web server 134 may allow users to search for websites or other items and requesting device 102 may provide search terms to referral web server 134 to initiate an online search. Subsequent to receiving the search terms, referral web server 134 may provide referral web page 136 to requesting device 102.

The operator of the referral website may have configured a link in referral web page 136 to link to a URL for the target website. Clicking on the link may cause web browser 104 to send web page request 106 to web server 110. Web page selection unit 112 may determine the search terms entered during the requesting device's interactions with the referral website based on web page request 106. The search terms may be one or more of the context value associated with web page request 106.

Other examples of referral website input that may be context values associated with a web page request include items of a referral website selected by a requesting device, a sort order characteristic selected by the requesting device, or a filter criteria selected by the requesting device. For example, referral web server 134 may be associated with a website that specializes in travel bookings. Referral web server 134 may present a web page containing a plurality of different hotels to requesting device 102. Requesting device 102 may send a selection to view further information about a particular hotel to referral web server 134. Additionally, requesting device 102 may provide preferred check-in and check-out dates. The requesting device may also chose to sort the hotels by a particular characteristic, such as price or popularity. The requesting device may have also provided a geographic location within which to search for hotels. Additionally, the request device may have filtered out hotels below a certain star rating. One or more of the hotel selection, the check-in and check-out dates, sort order characteristic selection, and the geographic location, and the star rating criteria sent by requesting device 102 to referral web server 134 may be determined by web page selection unit 112 and may be context value(s) associated with web page request 106.

Web page selection unit 112 may determine some or all of the context value(s) associated with a web page request by analyzing the web page request. For example, web page request 106 may be an HTTP request and some of the context values may be included in HTTP headers of the HTTP request. In an embodiment, web page request 106 is an HTTP request that contains the URL of a referral web page in the REFERER field of the HTTP header. Web page selection unit 112 may determine the referral web page or website based on the value of the REFERER field in the incoming request. Another context value associated with an incoming web page request may be the location of a requesting device, a demographic group to which the user of the requesting device is assumed to belong, or other information relating to the requesting device, all of which may be inferred based on an IP address of the requesting device. The IP address of the requesting device may be included in the HTTP header field of X-FORWARDED-FOR of the web page request. As another example, the preferred language of the requesting device may be another context value associated with the web page request. The preferred language may be identified in the HTTP header field of ACCEPT-LANGUAGE. In another embodiment, a context value associated with a web page request may indicate whether the request originated from a mobile device. Web page selection unit 112 may determine whether a web page request originated from a mobile device by determining whether the value in an HTTP header field of USER-AGENT matches a value associated with a mobile web browser.

In some embodiments, some or the all the context values may be determined by analyzing cookie values included in the incoming web page request. The cookies values may be included in an HTTP header field of COOKIE.

The domain name that was accessed by a web page request may be another context value associated with a web page request. The accessed domain name may be included in the HTTP header field of HOST. As another example, the date included in the HTTP header field of ACCEPT-DATETIME may also be a context value associated with a web page request.

Web page selection unit 112 may determine a history of requesting device 102 with the target website based on cookie values. For example, a context value associated with web page request 106 may indicate whether requesting device 102 has visited the website of the requested web page before.

Web servers such as target web server 110 or referral web server 134 may cause cookies to be stored at devices that request certain web pages of the associated website. For example, target web server 110 may have caused cookies 108 to be stored at requesting device 102 in response to requesting device 102 requesting a web page from target web server 110. When requesting device 102 subsequently requests another web page from the target website, web browser 104 may automatically include the values of cookies 108 in the web page request. Thus, in one embodiment, web page selection unit 112 may determine whether requesting device 102 has visited a web page of the target website before by determining whether a particular cookie values is contained in web page request 106.

In some embodiments, the cookie value may also specify which web page(s) of the website were visited before by requesting device 102. Other types of context values may also be determined based on cookie values. For example, the cookie values may identify input provided by requesting device 102 while interacting with the target website or other websites such as the referral website. In other embodiments, other types of context values or information used to determine context values may be stored in a cookie and sent to web server 110.

A third-party web page not associated with web server 110, such as a web page received from referral web server 134, may have also or instead caused cookies 108 to be stored at requesting device 102.

In some embodiments, a context value is identified as a request parameter of an incoming web page request or may be determined based on a value in the request parameter. The request parameter may be communicated in a variety of ways including, but not limited to, in a URL query string, posted form variable, or the body data of an HTTP request.

Figure 3:
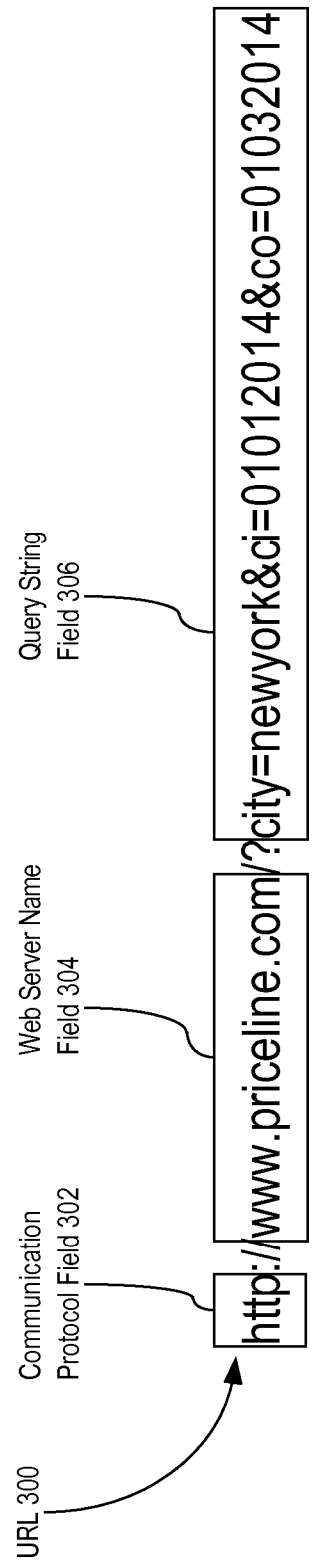
FIG. 3 illustrates components of an example uniform resource locator to which a web page request may be directed.

FIG. 3 illustrates components of an example URL to which a web page request, such as web page request 106, may be directed. The value "HTTP" in communication protocol field 302 of URL 300 identifies the communication protocol being used by web browser 104. Other protocols may be used, such as Hypertext Transfer Protocol Secure (HTTPS) for a secure request. The value "www.priceline.com" in web server name field 304 identifies the web server of the web page being requested. For example, web server 110 may be associated with the web server name of "www.priceline.com" and may receive requests directed to "www.priceline.com." Some of the values in query string field 306 may be context values or may be used by web page selection unit 112 to determine context values. For example, the query string of "city=newyork&ci=01012014&co=01032014" contains values for the three query string fields of city ("city"), check-in date ("ci"), and check-out date ("co"). The values in query string field 306 may have been determined based on input provided by requesting device 102 to referral web server 134.

A web server of a referral web page may include the input values received from a requesting device in a query string of a URL in a web page. For example, referral web server 134 may have received input values from requesting device 102.

Based on the received input values, referral web server 134 may include links in referral web page 136, which link to URLs with query strings identifying the received input values. For example, referral web server 134 may have included a particular link to URL 300 in referral web page 136. As a result, in response to determining a user selection of the particular link, web browser 104 may send web page request 106 to the web server associated with "www.priceline.com", which may be web server 110. Web browser 104 may provide the query string in query string field 306 to web server 110 by including the query string in web page request 106. As a result, web server 110 may determine the input provided by requesting device 102 during the requesting device's interactions with the referral website.

In other embodiments, other types of values may be included as web page request parameters. For example, an account name associated with requesting device 102 may be a context value associated with web page request 106. The account name may be a third-party account name used by the requesting device with the referral website. For example, requesting device 102 may log into an account associated with the referral website by providing an account name and password. After logging in, requesting device 102 may select to view a particular web page of the referral website, such as referral web page 136. In response to the selection, referral web server 134 may send referral web page 136 to requesting device 102 and the web page may include a link to a URL containing the account name used by requesting device 102 in a query string.

In some embodiments, the type of communication protocol used may be a context value used in the selection of a web page. For example, a different web page may be selected for a web page request that utilizes the HTTPS protocol versus a web page request that utilizes the HTTP protocol.

In some embodiments, a context value indicates whether a particular type of input was provided by a user. For example, referral web server 134 may only include a value for the check-in date parameter in query string field 306 if an input corresponding to a check-in date was received from requesting device 102. If web page selection unit 112 determines that web page request 106 contains a query string parameter corresponding to the field of "ci," web page selection unit 112 may determine that the value of a context value indicating whether a check-in date was specified is "true."

Other examples of input values that may be included as web page request parameters include the type of product the requesting device has indicated an interest in purchasing (e.g. whether the requesting device has selected to view an air, hotel, rental car, vacation package, or cruise product), currency type selected, language selected, travel preferences selected (e.g. wi-fi preferred), or trip type selected (e.g. one way, round trip, or multi-destination). Web page request parameters may also indicate referral device selections such as city, state, country, point of interest, origin airport, destination airport, currency, star rating, brand (e.g. for a rental car, airline, or hotel), number of tickets, number of travelers, number of child travelers, number of rooms, or sort order characteristics.

The type of offer method the requesting device has selected to view or has been viewing on the referral website may also be identified as a web page request parameter. For example, the requesting device may have been viewing a "name your own price" offer, where very limited information is presented about the item being purchased and a user "bids" on the item by offering different purchase amounts. Another type of offer is an "express deal" offer, where a user is able to view more details about the item being purchased, however the item is not identified to the user by name. A third type of offer is "retail," where the item being purchased is identified to the user by name and full details are given to the user about the item. A web page request parameter may indicate the particular offer type with which the requesting device was interacting with at the referral website. Each of the web page request parameter values described herein may be used as context values by web page selection unit 112.

A context value may also indicate the medium through which the requesting device was directed to the web page. For example, a web page request parameter may indicate that web page request 106 was sent in response to requesting device 102 selecting a link (a "referral link") in a particular medium, such as an advertisement in an e-mail or an advertisement displayed as a banner. Another context value may indicate which campaign the referral link belongs to, the type of content displayed in association with the referral link, or the type of advertisement network in which the referral link was displayed. In some embodiments, each referral link may be associated with a referral identifier and the referral identifier may be identified as a web page request parameter that is used as a context value to select a web page or determine content of the of the web page.

Another web page request parameter may indicate, for a request device which is connected to a telecommunications carrier network, the telecommunications carrier network to which requesting device 102 was connected to when web page request 106 was sent. A que web page request parameter may also indicate the device type, model, or whether the device is a mobile device. According to various embodiments, any of the context values described herein, or the information used to determine context values, may be provided to web server 110 using any of a plurality of methods including, but not limited to, sending the values or information in an HTTP header of a web page request, in cookie value(s) included in the web page request, as query string values in the web page request, or as some other web page request parameter. For example, although an account name is described above as being identified in a query string, in other embodiments, the account name may be identified to web page selection unit 112 as a cookie value instead.

One or more context values may be determined based on information contained in the web page request in combination with other information accessible to web page selection unit 112. For example, web page selection unit 112 may determine a context value based on an IP address or an account name identified in web page request 106 and user information 130. The context value may indicate whether any requesting device(s) associated with the IP address or account name previously provided a certain input.

Alternatively, the context value may identify the value of the input. For example, the context value may identify a search term previously provided by the requesting device 102 to web server 110.

In another embodiment, the context value may identify a trend in previous input received by one or more requesting devices associated with the IP address or account name. For example, a particular context value associated with web page request 106 may indicate the category of item most frequently selected by the requesting device(s) associated with the particular IP address or account name associated identified in web page request 106. The context value may indicate, for example, that requesting device(s) associated with the particular IP address or account name most frequently selected to purchase stays at four-star hotels as compared to hotels with other star ratings. Based on the determination, for any web page requests that are determined to be associated with the particular IP address or account name, web page selection unit 112 may determine a context value indicating that the web page request is associated with a four-star hotel preference. A requesting device may be determined to be associated with a particular IP address or account name if, for example, the IP address or account name is identified in a cookie value, HTTP header values, or a URL query string, or other request parameter included in a request received from the requesting device.

User information 130 may comprise input values provided by a plurality of requesting devices stored in association with an IP address and/or account name associated with the input values. For example, web server 110 may receive a web page request from a requesting device, where an account name is identified in a query string included in the request. Web page selection unit 112 may store data representing subsequent input received from the requesting device, such as data representing viewing or purchasing activities of the requesting device, in association with the account name. The account name may be a third-party account name used by requesting device 102 to access a referral website.

A context values associated with a web page request may be determined entirely independent of the web page request. For example, a context value associated with a web page request may indicate the status of business-specific information at the time the request is received. The operator of a target website may comprise proprietary business-specific information that may be used to determine a context value during the selection of a web page. In one embodiment, the business-specific information indicates the current value and/or availability of a commodity. The commodity may be any good or service, such as a good or service being sold by the operator of the target website.

For example, web server 110 may be associated with a travel company. The travel company may maintain business-specific information 132 indicating the availability of different hotels, flights, and other travel goods or services in addition to the average price of the travel goods and services. Business-specific information 132 may be updated frequently. Web page selection unit 112 may determine a context value associated with web page request 106 based on a value in business-specific information 132 at the request is received. A context value associated with web page request 106 may be, for example, the average cost of a four-star hotel at the time web page request 106 is received.

Figure 4:
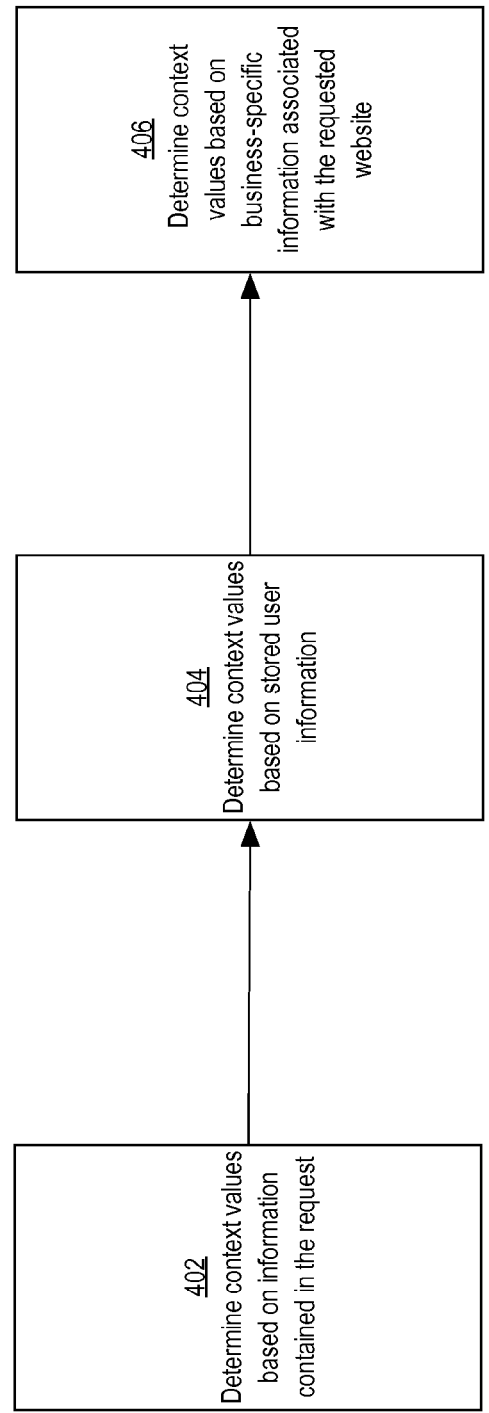
FIG. 4 illustrates an example process for determining context values associated with a web page request.

FIG. 4 illustrates an example process for determining context values associated with a web page request. The process of FIG. 4 may be performed at web page selection unit 112. At block 402, web page selection unit 112 determines context values based on information contained in the request. For example, web page selection unit may determine a referral web page or a third-party account name associated with the web page request based on information contained in the request.

At block 404, web page selection unit 112 determines context values based on stored user information. For example, based on user information 130, web page selection unit 112 may determine a context value indicating a purchasing habit of one or more requesting devices that log in using a particular account name identified in the web page request.

User information may be obtained from a third-party source using information included in a web page request such as an IP address or account name. For example, a third-party may determine user information by tracking the activities of a particular device and storing information determined or inferred about the particular device based on the particular device's activities in association with the IP address of the particular device or an account name associated with the particular device. Web server 110 may obtain user information from the third-party by providing to the third-party the IP address or account name associated with the user. For example, web page selection unit 112 may determine a context value indicating that the user associated with a particular IP address is likely to be a female in a particular age range based on information obtained from the third-party.

At block 406, web page selection unit 112 determines context values based on business-specific information associated with the requested website. For example, web page selection unit 112 may determine a context value indicating the level of availability for hotels in a particular geographic area based on business-specific information 132.

According to various embodiments, one or more of the steps of the process illustrated in FIG. 4 may be removed or the ordering of the steps may be changed. For example, in some embodiments, web page selection unit 112 may not determine any context values based on business-specific information.

In some embodiments, the types of context values determined for a web page request vary depending on the request. For example, web page selection unit 112 may determine that no account name is included in a web page request. Based on the determination, web page selection unit 112 may only determine context values based on information in the request and business-specific information and may not determine any context values based on stored user information.

In an embodiment, the lack of information contained in the web page request may be used as context value. For example, web page selection unit 112 may select a web page directed specifically to new users based on the determination that no request parameter representing an account name was included in the web page request. As another example, based on a determination that web page request 106 does not include indicate a sort order characteristic selected by requesting device 102, web page selection unit 112 may select a particular type of web page, or may order the web page in a particular default manner. The lack of user agent identification in web page request 106 may be another context value used by web page selection unit 112 to select a web page or to generate the content of the web page.

2.2 Selection of a Web Page Based on Context Values

At block 206, web page selection unit 112 selects a web page from a plurality of web pages based on a context value of the one or more context values associated with the request. Web page selection unit 112 may select a web page by comparing the one or more context values associated with web page request 106 with web page selection rules 116. Web page selection rules 116 may specify, for each of a set of context values or context value combinations, the corresponding web page that is selected.

The particular rules will vary according to different embodiments. In one embodiment, web page selection unit 112 selects a web page based on a context value that identifies a search term for which the requesting device searched on a referral website. For example, the website associated with web server 110 may be a travel website that has separate web pages for different destinations. According to web page selection rules 116, web page selection unit 112 may select web page 1 if requesting device 102 searched for the term "New York" at a referral website, web page 2 if requesting device 102 searched for the term "Los Angeles," or web page 3 if requesting device 102 did not search for either "New York" or "Los Angeles." Web page 1 may contain information specifically relating to the New York area, such as information about events and hotels in New York, and web page 2 may contain information specifically relating to the Los Angeles area.

In one embodiment, in response to selecting a web page, web page selection unit 112 may cause execution of instructions corresponding to the selected web page. For example, if web page 1 is selected, web page selection unit 112 may cause execution of web page 1 instructions 120. In other embodiments, the web pages may be stored at web server 110 and may not require the execution of any instructions for the web page to be generated.

A web page may be selected based on context values identifying other input provided by the requesting device. Other examples of requesting device input identified to web page selection unit 112 may include selections of items of the referral website. For example, if the referral website is a travel website, web page selection unit 112 may determine the identity of a hotel selected by requesting device 102. Based on the determination, web page selection unit 112 may select a web page that includes information about the same hotel.

In some embodiments, web page selection unit 112 may select a web page based on a context value identifying a referral website associated with a web page request. For example, a website operator may wish to direct users to different web pages associated with different stages in the purchasing process based on which website the user was viewing before being referred to the requested web page. Web page selection unit 112 may select for web page request 106 a first web page in which a check-out screen is depicted if referral web page 136 belongs to any of a first set of websites. Web page selection unit may select for the web page request a second web page, in which detailed information about a particular good or service is presented including a variety of customer reviews, if referral web page 136 belongs to any of a second set of websites. An operator of the target website may configure web page selection rules 116 to cause such a result based on a determination that users that are referred from the first set of web pages are very likely to proceed directly to a web page depicting a check-out screen whereas users that are referred to from the second set of web pages prefer to browse other web pages or request more information about the particular good or service before proceeding to a web page depicting a check-out screen.

Web page selection unit 112 may select a web page based on a context value indicating whether a particular type of input was provided by requesting device 102 to referral web server 134. For example, web page selection unit 112 may determine whether a query string value corresponding to a check-in date input is included in web page request 106. Based on the determination that a query string value corresponding to a check-in date input is included in web page request 106, web page selection unit 112 may select a particular web page associated with a check-out stage. A different web page that provides detailed information about one or more properties may be selected instead of a check-out web page if web page selection unit 112 determines that web page request 106 does not include a query string value corresponding to a check-in date, indicating that requesting device 102 did not provide a check-in date input to referral web server 134.

As another example, web page selection unit 112 may select a web page designed for a mobile device based on a determination that a context value indicating that the web page request originated from a mobile device is associated with a web page request.

As yet another example, web page selection unit 112 may select a web page based on a context value determined based on business-specific information 132. For example, the context value may indicate a relative level of availability in a particular geographic area. If the context value indicates that hotels are relatively scarce in a particular city, web page selection unit 112 may select a web page that contains detailed information about the single highest-rated hotel still available in a particular city, and which displays a message stating that very few hotels are available in the particular cit. If the context value indicates that there are a large number of hotels available in the particular city, web page selection unit 112 may select a web page that displays information about a plurality of hotels available in the city, and which displays a message stating that plenty of hotels area available.

Web page selection rules 116 may indicate a hierarchy of context values. If web page selection unit 112 determines two different context values associated with a web page request, web page selection rules 116 may indicate that a web page is to be selected based on, or contents of the web page is to be generated based on, a first context value instead of a second context value due to the first context value ranking higher in the hierarchy than the first context value. For example, web page selection rules 116 may include a first rule indicating that a certain web page is to be selected if a selection of city is identified in web page request 106 and a second rule indicating that a different web page is to be selected if a selection of a particular hotel is identified in web page request 106. The second rule may be ranked higher than the first, resulting in a particular web page being selected based on the hotel selected by requesting device 102 instead of the city selected by requesting device 102.

2.3 Generation of Web Page Content Based on Context Values

At block 208, content generation unit 114 determines some content of the selected web page based on a context value of the one or more context values associated with the request. The selected web page may be a dynamic web page, where a portion of the web page content is generated dynamically in response to receiving the web page request. Content generation unit 114 may cause the content to be generated based on web page content rules 118, which indicate the content that is generated for different context values or combinations of context values.

In other embodiments, step of block 208 is not performed. The selected web page may be a static web page where the content of the web page is not determined based on a context value associated with the web page request.

According to different embodiments, content generation unit 114 may determine at least a portion of the selected web page based on any of the context values discuss herein. For example, a particular context value may indicate that requesting device 102 requested a search at a referral website for a search string including the term "cheap." Based on the particular context value, content generation unit 114 may cause items in the selected web page to be ordered in ascending order based on price or may filter out items that are above a certain price range. In another embodiment, a context value determined based on web page request 106 may indicate that requesting device 102 sorted items displayed on a page of the referral website based on price. Based on the context value, content generation unit 114 may cause items in the selected web page to be displayed in ascending order based on price or may filter out items that are above a certain price range. If content generation unit 14 determines that neither a search string including the term "cheap" was received by the requesting device and that a sort order characteristic of price was not selected, the default action may be to sort the items in the selected web page by popularity.

As another example, based on a context value that identifies a particular referral website, content generation unit 114 may cause a particular item to be displayed within the selected page. For example, based on a determination that the web page request was referred from a particular website, content generation unit 114 may cause a banner to display at the top of the selected that includes a message welcoming visitors of the particular website.

In another embodiment, a context value may identify an item in a referral website that requesting device 102 has selected to view. Based on the context value, content generation unit 114 may cause the selected item to be displayed more prominently than the rest of the items in the selected web page. For example, requesting device 102 may have selected to view more details about a particular flight during its interactions with the referral website. Based on a context value indicating that requesting device 102 selected the particular flight, content generation unit 112 may cause information about the particular flight to be displayed at the top of the selected page.

In some embodiments, a context value may identify the location of requesting device 102. Content generation unit 114 or web page selection unit 112 may determine the location of requesting device 102 based on an IP address identified in web page request 106. Content generation unit 114 may cause certain content to be included in the selected web page based on the context value identifying the location of requesting device 102. For example, content generation unit 114 may filter out certain items if the web page request originates from any of a particular set of locations.

Content generation unit 114 may cause the selected web page to have a particular display style based on a context value. For example, the font style, font size, layout, or image sizes of a selected web page may be selected based on a context value that indicates whether requesting device 102 is a mobile device.

At block 210, web page selection unit 112 causes the selected web page to be delivered to the requesting device. In one embodiment, web page selection unit 112 redirects web browser 104 to the selected web page by providing web browser 104 with the URL for the selected web page. For example, web page selection unit 112 may receive web page request 106 as a result of web browser 104 directing the request to "http:/www.priceline.com." Based on one or more context values associated with web page request 106, web page selection unit 112 may select a web page located at "http:/www.priceline.com/hotels/newyork/." In response to the selection, web page selection unit 112 may send a redirection message to web browser 104 that causes web browser 104 to be redirected to "http:/www.priceline.com/hotels/newyork/." As a result of the redirection message, web browser 104 may send a new web page request to a web server associated with http:/www.priceline.com/hotels/newyork/." In another embodiment, web age selection unit 112 may retrieve the selected web page and deliver the selected web page to web browser 104 in response to the web page request without redirecting the web browser.

The selection and content generation results described herein are not limited to the particular context values described to illustrate the selection or content generation result. Each of the described selection and content generation results may be caused by any of the context values described herein. For example, content generation unit 114 may change the display order of items on a web page based only context values other than values identifying search terms or selections provide by the requesting device. In some embodiments, the sort order of items in a target web page may be determined based on another context values such as a context value identifying the determined location of the requesting device.

According to various embodiments, one or more of the steps of the process illustrated in FIG. 2 may be removed or the ordering of the steps may be changed. Additionally, although separate embodiments are discussed herein, any combination of embodiments and/or partial embodiments discussed herein may be combined to form further embodiments.

To illustrate a clear example, embodiments consisting of selecting web pages in response to a request for a web page are described. However, in other embodiments, website resources other than web pages, such as images and JSON data files, may be requested. A selection unit of web server 110 may select such a website resource from a plurality of website resources based on one or more context values associated with the website resource request, which may be any combination of the context values described herein.

3. Implementation Mechanism-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine customizable hard-wired logic, ASICs, or FPGAs with customizable programming to accomplish the techniques. The special-purpose computing devices may be desktop computer systems, portable computer systems, handheld devices, televisions, wearable computing devices, networking devices or any other device that incorporates hard-wired and/or program logic to implement the techniques.

Figure 5:
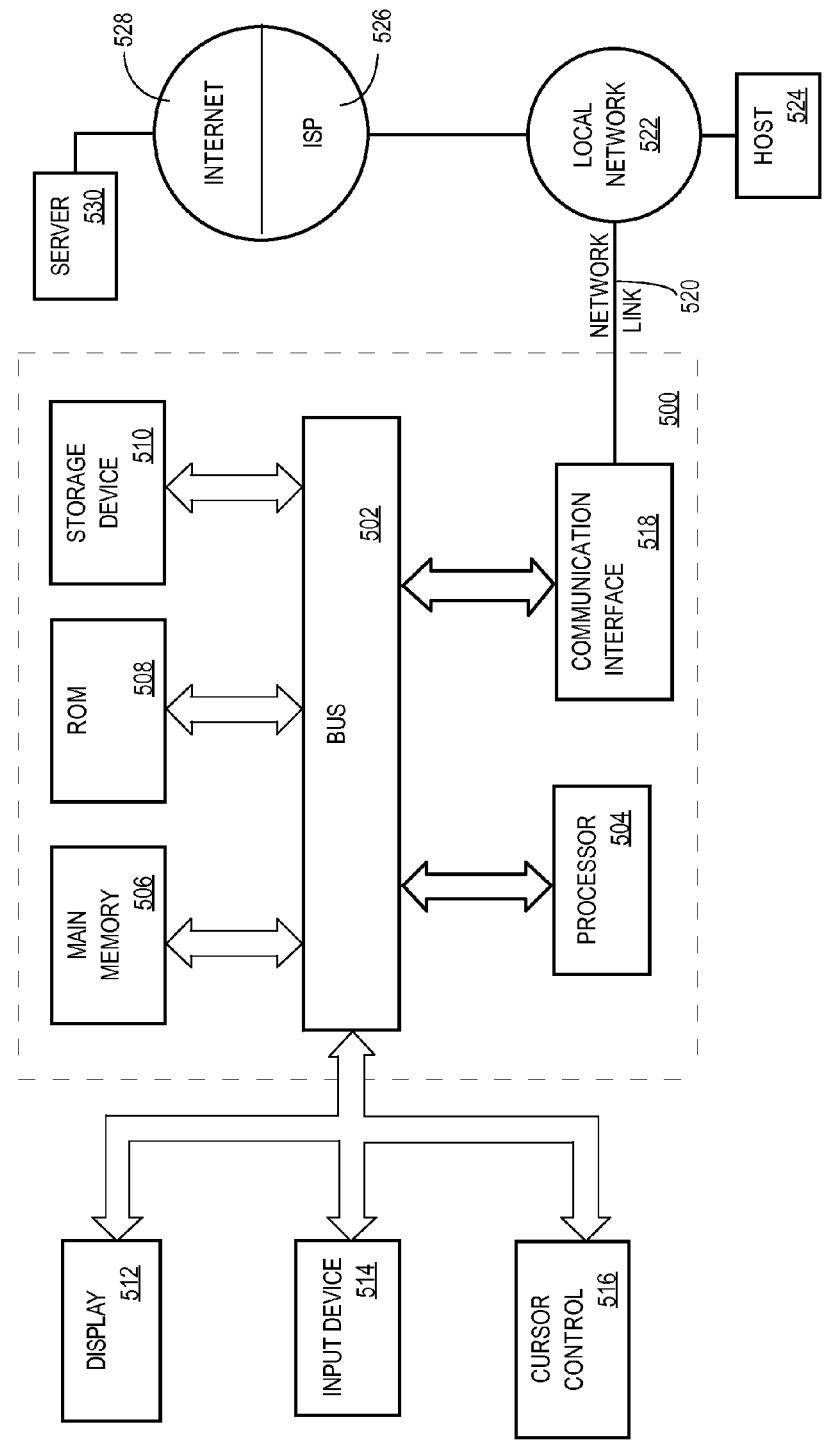
FIG. 5 is a block diagram that illustrates a computer system upon which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 5*a*, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In some embodiments, a customer interacts with computer system 500 via touch, for example, by tapping or gesturing over certain locations. A display screen of display 512 may also be capable of detecting touch.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, from a requesting computing device, a request for a resource of a requested website;
   using a server computer, determining a plurality of context values associated with the request, including a particular context value identifying information associated with a referral website that is different from the requested website;
   using the server computer, selecting a plurality of rules, wherein each of the plurality of rules specifies an expected context value, a website resource, and a rank, wherein the plurality of context values contains the expected context value;
   using the server computer, selecting a particular website resource from a plurality of website resources, wherein the particular website resource is the website resource of a rule having a highest rank of the plurality of rules;
   causing the particular website resource to be delivered to the requesting computing device.

2. The computer-implemented method of claim 1, wherein the request for a website resource is a request for a web page and the particular website resource is a particular web page.

3. The computer-implemented method of claim 2, comprising determining content of the particular web page based on at least one context value of the plurality of context values associated with the request.

4. The computer-implemented method of claim 3, comprising determining the content of the particular web page at least in part by determining a display order of items in the particular web page based on the at least one context value.

5. The computer-implemented method of claim 1, wherein the particular context value identifies the referral website and is included in a REFERER field of an HTTP header of the request.

6. The computer-implemented method of claim 1, comprising determining the plurality of context values associated with the request, including the particular context value, wherein the particular context value identifies an input value received by a server of the referral website from the requesting computing device.

7. The computer-implemented method of claim 6, wherein the input value is a search term provided by the requesting computing device to a server of the referral website.

8. The computer-implemented method of claim 6, wherein the input value identifies an item of the referral website selected by the requesting computing device.

9. The computer-implemented method of claim 1, comprising determining the particular context value based on a request parameter included in the request for the website resource.

10. The computer-implemented method of claim 1, comprising:
receiving a second request for the same website resource;
determining the plurality of context values associated with the second request, wherein the plurality of context values associated with the second request are different than the plurality of context values associated with the first request;
selecting a second website resource from the plurality of website resource based on the plurality of context values associated with the second request, wherein the second website resource is different than the particular website resource.

11. The computer-implemented method of claim 10, comprising receiving the request and the second request from different first and second requesting computing devices and wherein the request and the second request identify different first and second referral website comprising different first and second search engines.

12. The computer-implemented method of claim 10, wherein each of the particular website resource and the second website resource is associated with a different feature or function of the requested website.

13. The computer-implemented method of claim 1, wherein the particular website resource is a particular web page, the method comprising selecting the particular web page having a particular set of applications, features, or functions from a plurality of web pages based on the plurality of context values associated with the request.

14. The computer-implemented method of claim 1, comprising determining the plurality of context values associated with the request, including a second context value indicating a value or availability of a commodity at a time at which the request is received.

15. The computer-implemented method of claim 1, comprising determining the plurality of context values associated with the request, including the particular context value and a second context value, wherein the second context value indicates a history of the requesting device with the requested website.

16. A data processing apparatus comprising:
a server computer configured to host a web server;
a data storage device coupled to the server computer and storing a plurality of different website resources;
in the server computer, a website resource selection unit that is configured to:
receive, from a requesting computing device, a request for a resource of a requested website;
determine a plurality of context values associated with the request, including a particular context value identifying information associated with a referral website that is different from the requested website;
select a plurality of rules, wherein each of the plurality of rules specifies an expected context value, a website resource, and a rank, wherein the plurality of context values contains the expected context value;
select a particular website resource from a plurality of website resources, wherein the particular website resource is the website resource of a rule having a highest rank of the plurality of rules;
cause the particular website resource to be delivered to the requesting computing device.

17. The apparatus of claim 16, wherein the request for a website resource is a request for a web page and the particular website resource is a particular web page.

18. The apparatus of claim 17, further comprising a content generation unit coupled to the website resource selection unit and configured to determine content of the particular web page based on at least one context value of the plurality of context values associated with the request.

19. The apparatus of claim 18, wherein the website resource selection unit determines the content of the particular web page at least in part by determining a display order of items in the particular web page based on the at least one context value.

20. The apparatus of claim 16, wherein the particular context value identifies the referral website and is included in a REFERER field of an HTTP header of the request.

21. The apparatus of claim 16, wherein the website resource selection unit is further configured to determine the plurality of context values associated with the request, including the particular context value, wherein the particular context value identifies an input value received by a server of the referral website from the requesting computing device.

22. The apparatus of claim 21, wherein the input value is a search term provided by the requesting computing device to a server of the referral website.

23. The apparatus of claim 21, wherein the input value identifies an item of the referral website selected by the requesting computing device.

24. The apparatus of claim 16, wherein the website resource selection unit is further configured to determine the particular context value based on a request parameter included in the request for the website resource.

25. The apparatus of claim 16, wherein the website resource selection unit is further configured to:
receive a second request for the same website resource;
determine the plurality of context values associated with the second request, wherein the plurality of context values associated with the second request are different than the plurality of context values associated with the first request;

select a second website resource from the plurality of website resource based on the plurality of context values associated with the second request, wherein the second website resource is different than the particular website resource.

26. The apparatus of claim 25, wherein the website resource selection unit is further configured to receive the request and the second request from different first and second requesting computing devices and wherein the request and the second request identify different first and second referral website comprising different first and second search engines.

27. The apparatus of claim 25, wherein each of the particular website resource and the second website resource is associated with a different feature or function of the requested website.

28. The apparatus of claim 16, wherein the particular website resource is a particular web page;

wherein the website resource selection unit is further configured to select the particular web page having a particular set of applications, features, or functions from a plurality of web pages based on the plurality of context values associated with the request.

29. The apparatus of claim 16, wherein the website resource selection unit is further configured to: determine the plurality of context values associated with the request, including a second context value indicating a value or availability of a commodity at a time at which the request is received.

30. The apparatus of claim 16, wherein the website resource selection unit is further configured to determine the plurality of context values associated with the request, including the particular context value and a second context value, wherein the second context value indicates a history of a requesting device with the requested website.

* * * * *